(12) United States Patent
Yang et al.

(10) Patent No.: US 10,853,209 B2
(45) Date of Patent: Dec. 1, 2020

(54) METHOD, APPARATUS AND COMPUTER PROGRAM PRODUCT FOR DATA SYNCHRONIZATION

(71) Applicant: EMC IP Holding Company LLC, Hopkinton, MA (US)

(72) Inventors: Yue Yang, Beijing (CN); Xin Zhong, Beijing (CN); Yangfeng Chen, Beijing (CN); Qing Hua Ling, Beijing (CN); Yan Shao, Beijing (CN); Yuan Gu, Beijing (CN); Jianbao Li, Beijing (CN); Lei Han, Beijing (CN); Wei Feng, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 50 days.

(21) Appl. No.: 16/227,683

(22) Filed: Dec. 20, 2018

(65) Prior Publication Data
US 2019/0332503 A1  Oct. 31, 2019

(30) Foreign Application Priority Data
Apr. 28, 2018 (CN) .......................... 2018 1 0399269

(51) Int. Cl.
*G06F 11/20* (2006.01)
*G06F 11/16* (2006.01)
*H04L 12/24* (2006.01)
*H04L 29/08* (2006.01)

(52) U.S. Cl.
CPC ...... *G06F 11/2082* (2013.01); *G06F 11/1662* (2013.01); *G06F 11/2064* (2013.01); *H04L 41/0816* (2013.01); *H04L 67/1097* (2013.01); *G06F 2201/82* (2013.01)

(58) Field of Classification Search
CPC ............ G06F 11/2082; G06F 11/1662; G06F 11/2064; G06F 2201/82; G06F 11/1451; G06F 11/1471; H04L 41/0816; H04L 67/1095
See application file for complete search history.

(56) References Cited

U.S. PATENT DOCUMENTS

| 7,475,207 B2 | 1/2009 | Bromling et al. |
| 8,438,135 B1 | 5/2013 | Natanzon et al. |
| 8,996,827 B1 * | 3/2015 | Natanzon ................ G06F 3/065 711/162 |
| 9,336,230 B1 | 5/2016 | Natanzon |
| 10,061,666 B1 | 8/2018 | Natanzon et al. |

(Continued)

*Primary Examiner* — Masud K Khan
(74) *Attorney, Agent, or Firm* — BainwoodHuang

(57) ABSTRACT

Techniques for data synchronization involve obtaining a first bitmap about a first storage device, the first storage device including a group of storage areas, a bit in the first bitmap indicating whether data in a corresponding storage area of a first size in the group of storage areas is to be synchronized to a second storage device. The technique further involves, in response to a configuration of the first storage device being changed, determining a second size of a storage area in the group of storage areas. The technique further involves converting the first bitmap into a second bitmap based on the first size and the second size. In addition, the technique further involves synchronizing data from the first storage device to the second storage device based on the second size and the second bitmap.

20 Claims, 6 Drawing Sheets

(56) References Cited

U.S. PATENT DOCUMENTS

| | | | |
|---|---|---|---|
| 2007/0156983 A1* | 7/2007 | Kern | G06F 11/2064 |
| | | | 711/162 |
| 2008/0016295 A1* | 1/2008 | Yim | G06F 11/2082 |
| | | | 711/156 |
| 2014/0108756 A1* | 4/2014 | Brown | G06F 3/0619 |
| | | | 711/162 |
| 2018/0341405 A1* | 11/2018 | Brown | G06F 11/2064 |

* cited by examiner

METHOD, APPARATUS AND COMPUTER PROGRAM PRODUCT FOR DATA SYNCHRONIZATION

FIELD

Embodiments of the present disclosure generally relate to the field of data storage, and more specifically, to a method, apparatus and computer program product for data synchronization.

BACKGROUND

In a modern storage system, for the purpose of protecting data, data written into a storage device (hereinafter also referred to as "source storage device") may usually be written into another storage device (hereinafter also referred to as "destination storage device") synchronously to achieve backup for the data. This kind of data backup is also referred to as data synchronization from the source storage device to the destination storage device. Generally, a bitmap may be used to indicate which data in the source storage device is to be synchronized to the destination storage device. For example, bits in the bitmap may correspond to storage areas of a particular size on the source storage device. While writing to the source storage device, at least one bit in the bitmap corresponding to a storage area to be written may be set to indicate that data in the storage area is to be synchronized to the destination storage device.

The bitmap may be stored in association with information about the size of the storage area in a persistent storage device (for instance, a predetermined storage area of the source storage device). In this way, if a failure occurs in the system during data synchronization, the bitmap and the information can be read from the persistent storage device upon the failure being recovered, and then the unfinished data synchronization can be continued based thereon. If the configuration of the source storage device changes (for instance, its size changes), the size of the storage area corresponding to one bit in the bitmap may be changed. Therefore, the bitmap and the information about the size of the storage area stored in the persistent storage device should be updated accordingly. However, if a failure occurs in the system in the middle of the updating, it may result in mismatch between the bitmap and the information about the size of the storage area, thereby causing data loss or data inconsistency between the source storage device and the destination storage device.

SUMMARY

Embodiments of the present disclosure provide a method, apparatus and computer program product for data synchronization.

In a first aspect of the present disclosure, there is provided a method for data synchronization. The method includes obtaining a first bitmap provided for (or about) a first storage device, the first storage device including a group of storage areas, a bit in the first bitmap indicating whether data in a corresponding storage area of a first size in the group of storage areas is to be synchronized to a second storage device. The method further includes, in response to a configuration of the first storage device being changed, determining a second size of a storage area in the group of storage areas. The method further includes converting the first bitmap into a second bitmap based on the first size and the second size, a bit in the second bitmap indicating whether data in a corresponding storage area of the second size in the group of storage areas is to be synchronized to the second storage device. Moreover, the method further includes synchronizing data from the first storage device to the second storage device based on the second size and the second bitmap.

In a second aspect of the present disclosure, there is provided an apparatus for data synchronization. The apparatus includes at least one processing unit and at least one memory. The at least one memory is coupled to the at least one processing unit and stores instructions for execution by the at least one processing unit. The instructions, when executed by the at least one processing unit, cause the device to perform acts including: obtaining a first bitmap provided for a first storage device, the first storage device including a group of storage areas, a bit in the first bitmap indicating whether data in a corresponding storage area of a first size in the group of storage areas is to be synchronized to a second storage device; in response to a configuration of the first storage device being changed, determining a second size of a storage area in the group of storage areas; converting the first bitmap into a second bitmap based on the first size and the second size, a bit in the second bitmap indicating whether data in a corresponding storage area of the second size in the group of storage areas is to be synchronized to the second storage device; and synchronizing, based on the second size and the second bitmap, data from the first storage device to the second storage device.

In a third aspect of the present disclosure, there is provided a computer program product tangibly stored on a non-transient computer readable medium and including machine executable instructions. The machine executable instructions, when executed by the device, cause the device to implement any step of the method according to the first aspect.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description with reference to the accompanying drawings, the above and other objectives, features, and advantages of example embodiments of the present disclosure will become more apparent. In example embodiments of the present disclosure, the same reference symbols usually represent the same components.

Throughout the drawings, the same or corresponding reference symbols are used to indicate the same or corresponding parts.

DETAILED DESCRIPTION OF EMBODIMENTS

Figure 1:
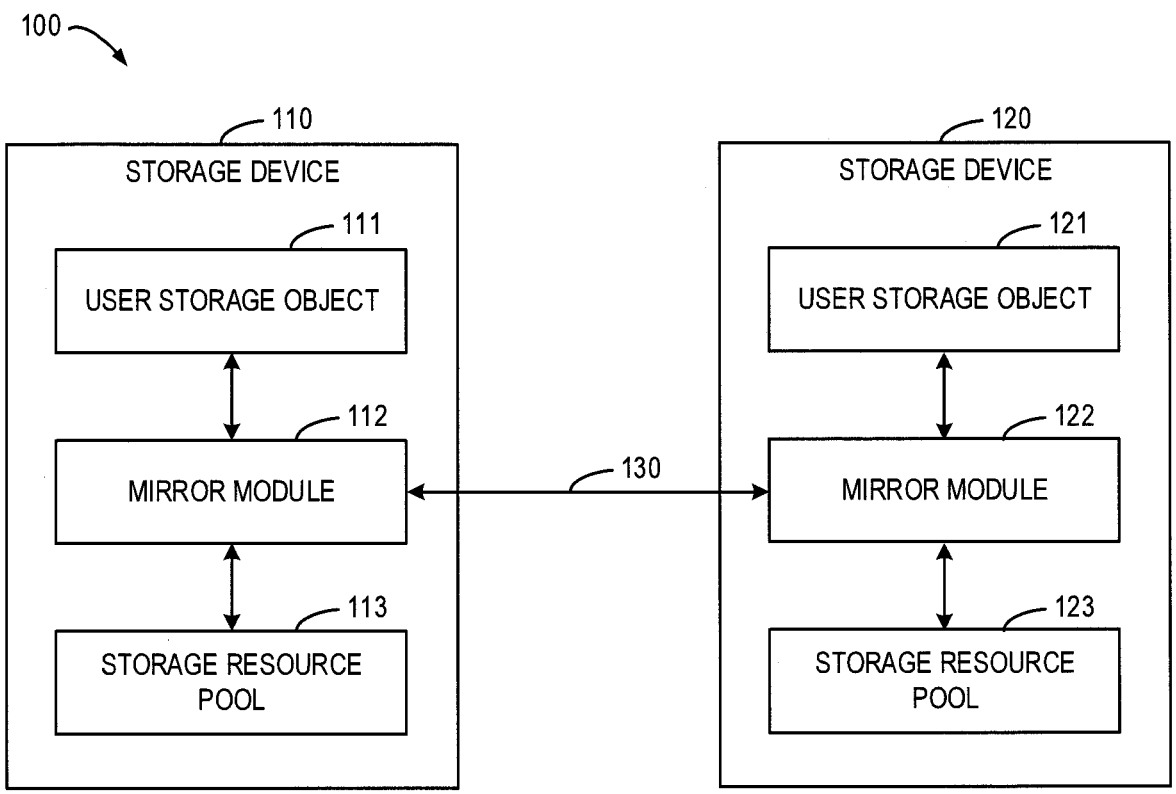
FIG. 1 illustrates a block diagram of an example storage system in which some embodiments of the present disclosure can be implemented.

Preferred embodiments of the present disclosure will be described in the following in greater detail with reference to the drawings. Although preferred embodiments of the present disclosure are displayed in the drawings, it is to be understood that the present disclosure can be implemented in various manners, not limited to the embodiments illustrated herein. On the contrary, these embodiments are provided to make the present disclosure more thorough and complete and convey the scope of the present disclosure completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "an example embodiment" and "an embodiment" are to be read as "at least one example embodiment." The term "another embodiment" is to be read as "at least another embodiment." Terms "first," "second" and others can denote different or identical objects. The following text may also contain other explicit or implicit definitions.

As depicted above, in a modern storage system, for the purpose of protecting data, data written into the source storage device may usually be written into a destination storage device synchronously to achieve backup for the data. Generally, a bitmap may be used to indicate which data in the source storage device is to be synchronized to the destination storage device. The bitmap may be stored in association with information about (or describing) the size of the storage area in a particular persistent storage device (for instance, a predetermined storage area of the source storage device). In this way, if a failure occurs in the system during data synchronization, the bitmap and the information can be read from the persistent storage device upon the failure being recovered, and then the unfinished data synchronization can be continued based thereon.

However, if the configuration of the source storage device changes (for instance, its size changes), the size of the storage area corresponding to one bit in the bitmap may be changed. Therefore, the bitmap and the information about the size of the storage area stored in the persistent storage device should be updated accordingly. No matter which one of the two is updated first, if a failure occurs in the system in the middle of the updating, it may result in mismatch between the bitmap and the information about the size of the storage area (for instance, the bitmap has been updated while the information has not, or the information has been updated while the bitmap has not), thereby causing data loss or data inconsistency between the source storage device and the destination storage device.

Example embodiments of the present disclosure provide a scheme for data synchronization which is aimed to solve one or more of the above and other potential problems. The scheme can ensure that the bitmap for data synchronization and the information about the size of the storage area are matched with each other, thereby avoiding data inconsistency between the source storage device and destination storage device due to various failure conditions.

FIG. 1 illustrates a block diagram of an example storage system 100 in which some embodiments of the present disclosure can be implemented. As shown in FIG. 1, the example storage system 100 may generally include a first storage device 110 and a second storage device 120, both of which may be interconnected with each other locally or remotely via a data channel 130. The data channel 130 may be any interface or communication channel that can be used for data transmission, such as a fiber channel. It is to be understood that the structure and functions of the example storage system 100 are described only for the purpose of illustration, without suggesting any limitation to the scope of the present disclosure. Embodiments of the present disclosure may also be applied to a storage system having different structure and/or functions. In the following, the first storage device 110 may be used interchangeably with "source storage device", while the second storage device 120 may be used interchangeably with "destination storage device."

As shown in FIG. 1, the first storage device 110 may include a storage resource pool 113 which includes one or more disks. A "disk" herein may refer to any non-volatile storage medium currently known or to be developed in the future, such as magnetic disk, optical disk, solid state disk (SSD), and disk array or disk array group formed by various types of disks, and so on. Based on the physical storage resources provided by the storage resource pool 113, a user storage object 111 may be created on the storage device 110 for operation by a host and/or application (not shown). The user storage object as used herein refers to a logical storage object constructed based on physical storage resources and a mapping relationship exists between the logical storage object and the physical storage resources. Examples of the user storage object 111 may include, but are not limited to, a logic storage unit (such as logic unit number (LUN)), a file system (FS) and the like.

As shown in FIG. 1, the first storage device 110 may further include a mirror module 112 for enabling the storage device 110 to synchronize data with the second storage device 120 via the data channel 130. The second storage device 120 may have completely the same structure as the first storage device 110 and the two serve as mirror for each other. For example, the second storage device 120 may have a storage resource pool 123 corresponding to the storage resource pool 113 and a user storage object 121 corresponding to the user storage object 111. The second storage device 120 further includes a mirror module 122 for cooperating with the mirror module 112 to synchronize data from the first storage device 110 to the second storage device 120.

The mirror module 112 in the first storage device 110 may utilize a bitmap to indicate which data in the first storage device 110 are to be synchronized to the second storage device 120. The bitmap may correspond to the user storage object 111 (such as LUN or FS) that is operable by the host and/or upper-layer application. For example, the user storage object 111 may provide a storage area of a particular size to the host and/or application for use. The storage area of the particular size may be considered as a group of storage areas, each of which may correspond to a respective physical storage resource (for example, one or more disks, or one or more extents in the disk) in the storage resource pool 113. The bitmap may have a plurality of bits corresponding to the group of storage areas, each of the plurality of bits corresponding to one of the group of storage areas. When the host and/or application operates the user storage object 111 to write data into the first storage device 110, the mirror module 112 may write the data into a corresponding physical storage resource in the storage resource pool 113. Mean-while, the mirror module 112 may also mark one or more bits in the bitmap corresponding to the storage area to be written as "dirty" (for instance, set it "1"), indicating that data in the corresponding storage area is to be synchronized to the second storage device 120.

When a data synchronization process is initiated, the mirror module 112 may perform a data synchronization operation based on the recorded bitmap and information about the size of a storage area corresponding to a bit in the bitmap. For example, the mirror module 112 may scan each of the bits in the bitmap. When it is found that a bit in the bitmap is marked as "dirty," the mirror module 112 may read data in the storage area corresponding to the bit, and transmit the read data to the mirror module 122 in the second storage device 120 via the data channel 130. In response to receiving data from the mirror module 112, the mirror module 122 stores the data in the corresponding storage area in the second storage device 120. In response to the data in the storage area corresponding to the bit marked as "dirty" being synchronized to the second storage device 120, the mirror module 112 may clear the mark of the bit (for instance, set it as "0") to indicate that data in the corresponding storage area has been synchronized.

To prevent loss of bitmap information due to system breakdown or reboot, the mirror module 112 may store the bitmap for data synchronization in association with the information about the size of the storage area corresponding to a bit in the bitmap in a persistent storage device. For example, the persistent storage device may be an individual device (not shown in FIG. 1) separate from the first storage device 110 and the second storage device 120, or a specific persistent storage area provided by the first storage device 110. For example, a dedicated storage object (for example, a private LUN) for saving system information may be created based on a part of physical storage resources in the storage resource pool 113. Different from the user storage object 111 operable for the host and/or upper layer application, the dedicated storage object may only be used for storing important system information and cannot be operated by the host and/or upper layer application. The mirror module 112 may store the bitmap for data synchronization in association with the information about the size of the storage area corresponding to a bit in the bitmap in the dedicated storage object (for instance, a private LUN). In this way, if a failure occurs in the system during data synchronization (for example, the first storage device 110 breaks down), the bitmap and the information can be read from the persistent storage device upon the failure being recovered (for example, the first storage device 110 is restarted), and then the unfinished data synchronization can be continued on this basis. It is to be understood that the bitmap for data synchronization and the information about the size of the storage area corresponding to a bit in the bitmap may be stored in the same persistent storage device, or in different persistent storage devices, and the scope of the present disclosure is not limited in this regard.

The user storage object 111 provided by the first storage device 110 to the host and/or upper layer application may be configured dynamically. For example, the user storage object 111 might expand or shrink over time and thus, its size may be changed accordingly. However, as the size of the persistent storage device used for storing the bitmap is generally fixed, the number of bits in the bitmap corresponding to the user storage object 111 may also fixed generally. In this case, when the size of the user storage object 111 is changed, the size of a storage area that one bit in the bitmap corresponds to may be changed accordingly. The actual size of a storage area may be determined based on the size of the changed user storage object 111 and the number of bits in the bitmap. To ensure correct implementation of data synchronization, the mirror module 112 may need to update the bitmap for data synchronization and the information about the size of the storage area accordingly, and perform the data synchronization operation based on the updated bitmap and the actual size of the storage area.

Figure 2:
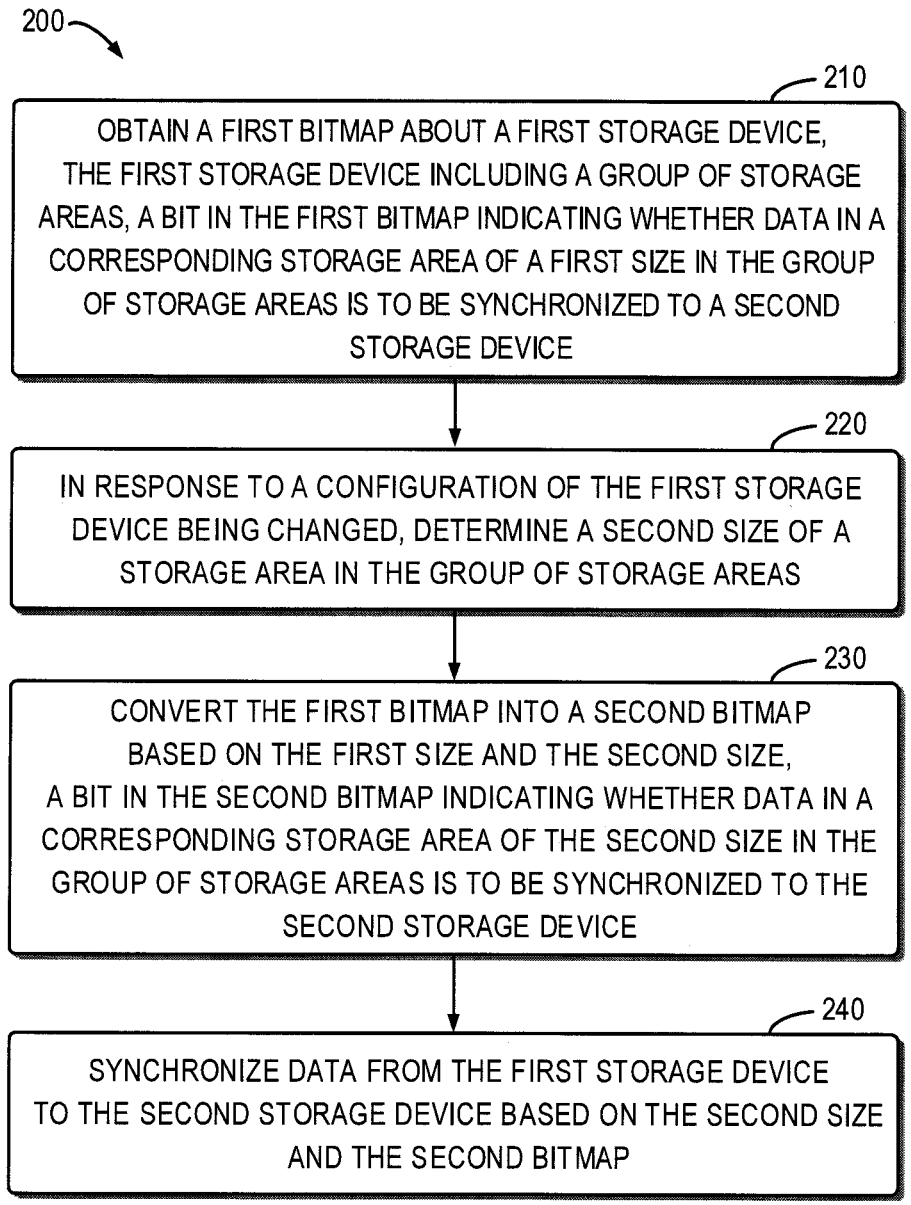
FIG. 2 illustrates a flowchart of a method for data synchronization in accordance with some embodiments of the present disclosure.

FIG. 2 illustrates a flowchart of a method 200 for data synchronization in accordance with some embodiments of the present disclosure. For example, the method 200 may be performed by the mirror module 112 shown in FIG. 1. Various acts in the method 200 will be described below in detail with reference to FIG. 1. It is to be understood that the method 200 may further include additional acts not shown and/or omit some shown acts, and the scope of the present disclosure is not limited in this regard.

At block 210, the mirror module 112 obtains a first bitmap provided for the first storage device 110. In some embodiments, the first bitmap may be a bitmap for data synchronization prior to the configuration of the first storage device 110 being changed. In some embodiments, the first bitmap may indicate whether data in each of the group of storage areas (for example, the group of storage areas corresponding to the user storage object 111) included in the first storage device 110 is to be synchronized to the second storage device 120. As described above, the first bitmap and the information about (or describing) the size of the storage area corresponding to a bit in the bitmap may be stored in association with each other in a persistent storage device. Therefore, the mirror module 112 may obtain the first bitmap provided for the first storage device 110 from the specific persistent storage device. Additionally, the mirror module 112 may also obtain, from the persistent storage device, the information about (or describing) the size of the storage area (the size of the storage area associated with the first bitmap may also be referred to as "first size" herein) corresponding to a bit in the bitmap (the information about the first size may also be referred to as "first information" herein).

At block 220, in response to a configuration of the first storage device 110 being changed, the mirror module 112 may determine a second size of a storage area in the group of storage areas. In some embodiments, for instance, the configuration of the first storage device 110 may indicate the size of the group of storage areas provided by the user storage object 111. When the size of the group of storage areas is changed, the mirror module 112 may determine, based on the changed size of the group of storage areas and the number of bits in the bitmap, the second size of the storage area indicated by each of the bits in the bitmap. For example, the second size may be determined by dividing the changed size of the group of storage areas provided by the user storage object 111 by the number of bits in the bitmap.

At block 230, the mirror module 112 converts the first bitmap into the second bitmap based on the first size and second size. In some embodiments, when the first size is below the second size (namely, the storage area is expanded), one or more bits in the first bitmap may be merged into one bit in the second bitmap. In some other embodiments, when the first size is greater than the second size (namely, the storage area is shrinked), a bit in the first bitmap may be divided into one or more bits in the second bitmap.

Figure 3:
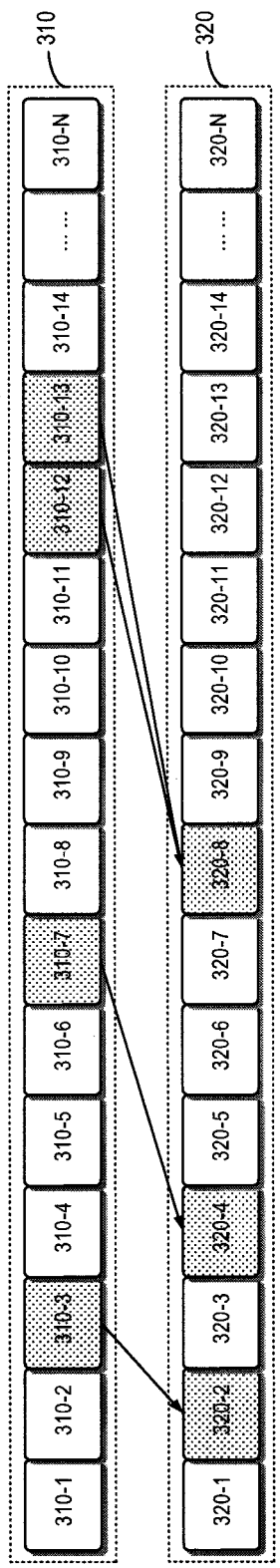
FIG. 3 illustrates a schematic diagram of a first bitmap and a second bitmap converted therefrom in accordance with some embodiments of the present disclosure.

FIG. 3 is a schematic diagram illustrating a first bitmap 310 and a second bitmap 320 in accordance with some embodiments of the present disclosure. For instance, the example shown in FIG. 3 corresponds to the case where the storage area is expanded. As shown in FIG. 3, the first bitmap 310 may include N bits 310-1, 310-2, ..., 310-N corresponding to the N storage areas respectively, where the shaded bits 310-3, 310-7, 310-12 and 310-13 are marked as "dirty" to indicate that data in the storage areas corresponding to these bits is to be synchronized to the second storage device 120. When the size of the storage area is changed from the first size to a second size, the mirror module 112 may convert the first bitmap 310 into the second bitmap 320 based on the first size and the second size. In particular, for the bit 310-3 marked as "dirty" in the first bitmap 310, the mirror module 112 may determine the start position and end position of the storage area corresponding to the bit 310-3 based on the first size. The mirror module 112 may then determine, based on the start position and end position of the storage area and the second size, the bit corresponding to the storage area in the second bitmap 320, for instance, a bit 320-2. In this way, the mirror module 112 may determine that the bit 310-7 in the first bitmap 310 corresponds to a bit 320-4 in the second bitmap 320, and the bits 310-12 and 310-13 in the first bitmap 310 correspond to a bit 320-8 in the second bitmap 320.

Referring back to FIG. 2, at block 240, the mirror module 112 synchronizes data from the first storage device 110 to the second storage device 120 based on the second size and the second bitmap. In some embodiments, to prevent loss of bitmap information due to system breakdown or reboot, the mirror module 112 may first store the second bitmap and information about (or describing) the second size (also referred to as "second information" herein) in a specific storage device. Then, the mirror module 112 may synchronize data from the first storage device 110 to the second storage device 120 in response to the second bitmap and the second information being stored in the specific storage device.

In some embodiments, to ensure that the bitmap for data synchronization and the information about the size of the storage area are matched with each other all the time, the mirror module 112 may not store the second bitmap and the second information directly into the specific persistent storage device. Instead, the mirror module 112 may combine the first bitmap and the second bitmap into a third bitmap including all the information of the two and store the third bitmap into the specific persistent storage device. In response to the first information about the first size stored in the specific persistent storage device being replaced with the second information, the mirror module 112 may replace the third bitmap stored in the specific persistent storage device with the second bitmap. In this manner, it can be ensured that the bitmap for data synchronization and the information about the size of the storage area are matched with each other, thereby avoiding data inconsistency between the first storage device 110 and the second storage device 120 due to various failure conditions.

Figure 4:
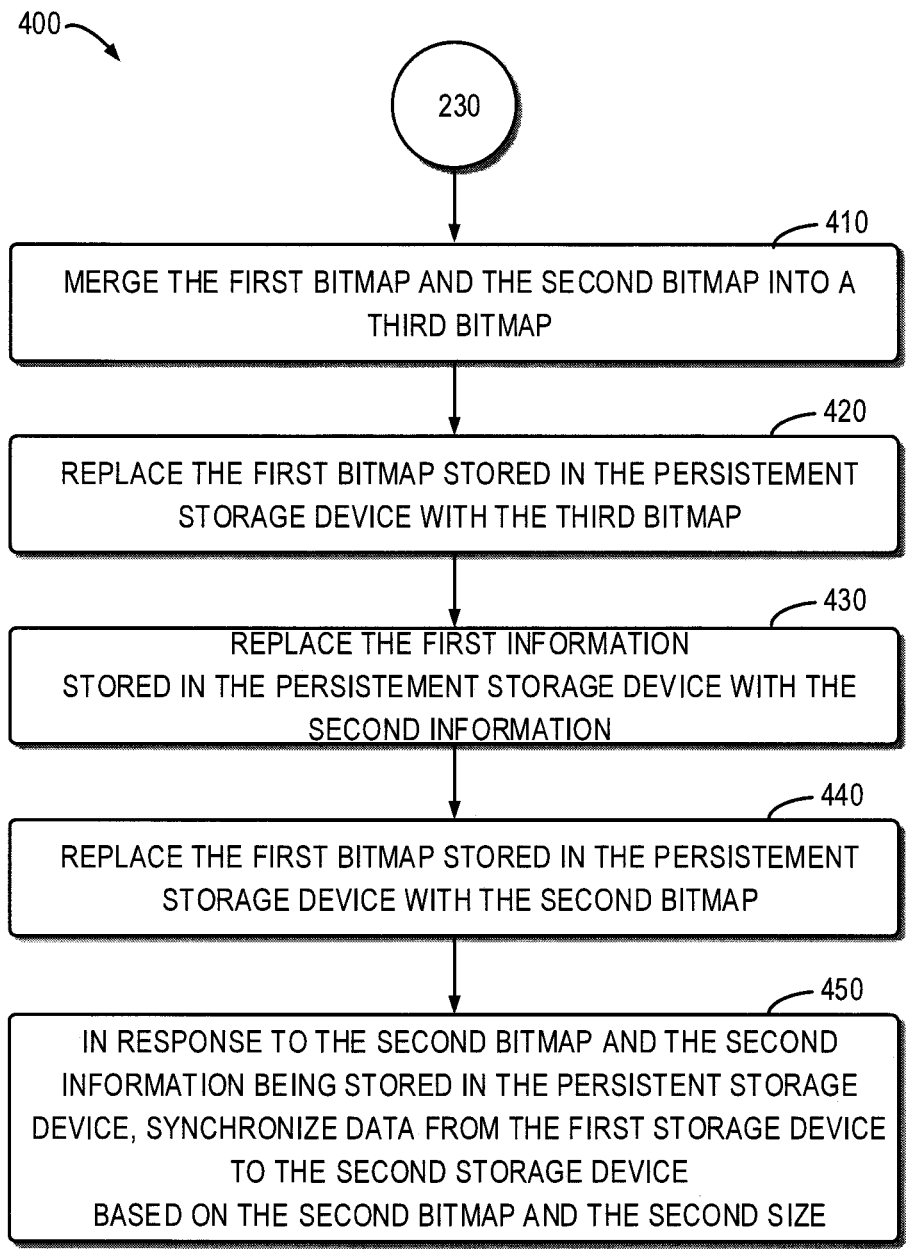
FIG. 4 illustrates a flowchart of a method for data synchronization in accordance with some embodiments of the present disclosure.

FIG. 4 is a flowchart illustrating a method 400 for data synchronization in accordance with some embodiments of the present disclosure. The method 400 may act as an example implementation of the block 240 shown in FIG. 2 and may be performed subsequent to block 230. For example, the method 400 may be performed by the mirror module 112 shown in FIG. 1. It is to be understood that method 400 may further include additional acts not shown and/or omit some shown acts and the scope of the present disclosure is not limited in this regard.

At block 410, the mirror module 112 merges the first bitmap and the second bitmap into the third bitmap. In some embodiments, the first bitmap may indicate that data in a first storage area from the group of storage areas is to be synchronized to the second storage device, and the second bitmap may indicate that data in a second storage area from the group of storage areas is to be synchronized to the second storage device. The third bitmap may have the same number of bits as the first bitmap and the second bitmap, which may indicate that data in both the first storage area and the second storage area is to be synchronized into the second storage device.

Figure 5:
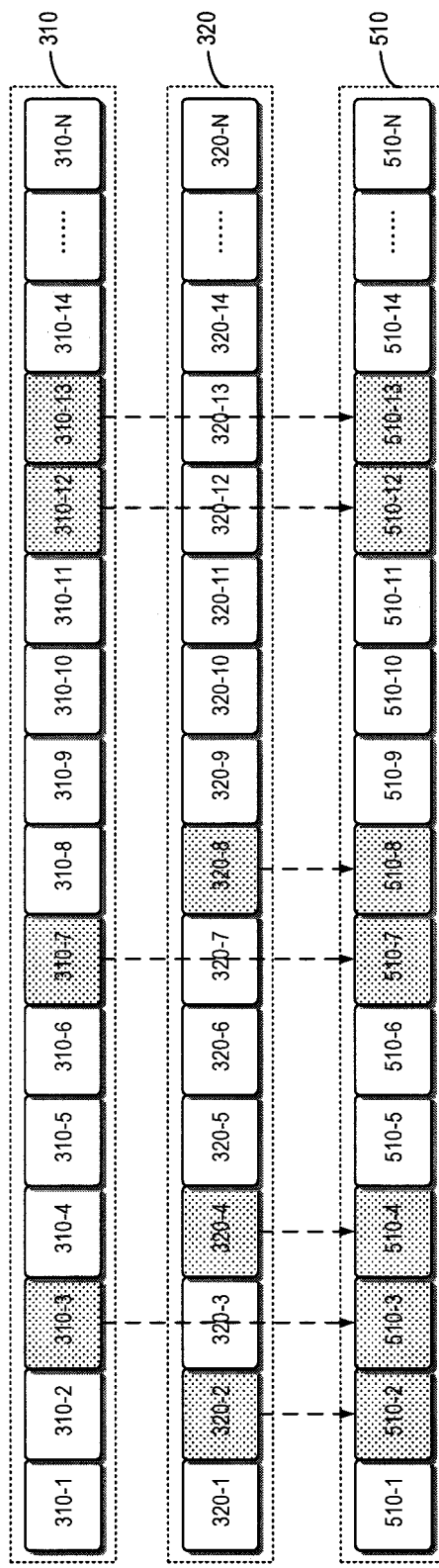
FIG. 5 illustrates a schematic diagram of a third bitmap generated by merging a first bitmap and a second bitmap in accordance with some embodiments of the present disclosure.

FIG. 5 illustrates a schematic diagram of a third bitmap generated by merging the first bitmap and the second bitmap in accordance with some embodiments of the present disclosure. FIG. 5 illustrates the first bitmap 310 shown in FIG. 3 and the second bitmap 320 converted from the first bitmap 310. The bits 310-3, 310-7, 310-12 and 310-13 in the first bitmap 310 are marked as "dirty," while the bits 320-2, 320-4 and 320-8 in the second bitmap 320 are marked as "dirty." FIG. 5 further illustrates a third bitmap 510 generated by merging the first bitmap 310 and the second bitmap 320. As shown in FIG. 5, in the third bitmap 510, bits which correspond to the dirty bits in the first bitmap 310 are marked as "dirty," as shown by bits 510-3, 510-7, 510-12 and 510-13. Moreover, in the third bitmap 510, bits which correspond to the dirty bits in the second bitmap 320 are marked as "dirty," as shown by bits 510-2, 510-4 and 510-8. In this way, the third bitmap 510 can include all the information of both the first bitmap 310 and the second bitmap 320.

Referring back to FIG. 4, at block 420, the mirror module 112 replaces the first bitmap stored in the persistent storage device with the third bitmap. Taking the example shown in FIG. 5 as an example, the mirror module 112 may store the third bitmap 510 shown in FIG. 5 in the persistent storage device to replace the first bitmap 301 stored previously. In this way, the third bitmap and the first information about the first size are stored in the persistent storage device.

In some embodiments, if the first storage device 110 fails and then reboots subsequent to block 420 being performed, the mirror module 112 may read the third bitmap and the first information from the persistent storage device. The mirror module 112 may determine the first size of the storage area based on the first information, and perform synchronization from the first storage device 110 to the second storage device 120 based on the first size and the third bitmap. Since the third bitmap contains all the bits marked as "dirty" in the first bitmap, data in the storage areas corresponding to these bits will be synchronized based on the first size. The mirror module 112 can synchronize all of the data that needs to be synchronized in the first storage device 110 to the second storage device 120. Although the third bitmap further includes all the bits marked as "dirty" in the second bitmap and thus, the mirror module 112 will perform data synchronization for these bits based on the first size, it can be seen that the synchronization for these bits will not cause data inconsistency between the first storage device 110 and the second storage device 120 because these bits do not indicate the storage areas that actually need to be synchronized.

At block 430, the mirror module 112 replaces the first information stored in the persistent storage device with the second information about the second size. In this way, the third bitmap and the second information about the second size are stored in the persistent storage device.

In some embodiments, if the first storage device 110 fails and then reboots subsequent to block 430 being performed, the mirror module 112 may read the third bitmap and the second information from the persistent storage device. The mirror module 112 may determine the second size of the storage area based on the second information, and perform synchronization from the first storage device 110 to the second storage device 120 based on the second size and the third bitmap. Since the third bitmap contains all the bits marked as "dirty" in the second bitmap, data in the storage areas corresponding to these bits will be synchronized based on the second size. The mirror module 112 can synchronize all of the data that needs to be synchronized in the first storage device 110 to the second storage device 120. Although the third bitmap further includes all the bits marked as "dirty" in the first bitmap and thus, the mirror module 112 will perform data synchronization for these bits based on the second size, it can be seen that the synchronization for these bits will not cause data inconsistency between the first storage device 110 and the second storage device 120 because these bits do not indicate the storage areas that actually need to be synchronized.

At block 440, the mirror module 112 replaces the third bitmap stored in the persistent storage device with the second bitmap. In this way, the second bitmap and the second information are stored in the specific persistent storage device.

In some embodiments, if the first storage device 110 fails and then reboots subsequent to block 440 being performed, the mirror module 112 may read the second bitmap and the second information from the persistent storage device. The mirror module 112 may determine the second size of the storage area based on the second information and perform synchronization from the first storage device 110 to the second storage device 120 based on the second size and second bitmap. As the second size and the second bitmap are matched with each other, the mirror module 112 can synchronize all of the data that needs to be synchronized in the first storage device 110 based on the second size and the second bitmap.

At block 450, in response to the second bitmap and the second information being stored in the persistent storage device, the mirror module 112 synchronizes data from the first storage device 110 to the second storage device 120 based on the second bitmap and the second size indicated by the second information.

As can be seen from the above depiction, the scheme for data synchronization proposed in example embodiments of the present disclosure can ensure that the bitmap for data synchronization and the information about the size of the storage area are matched with each other, thereby avoiding data loss or data inconsistency between the source storage device and the destination storage device due to various failure conditions.

Figure 6:
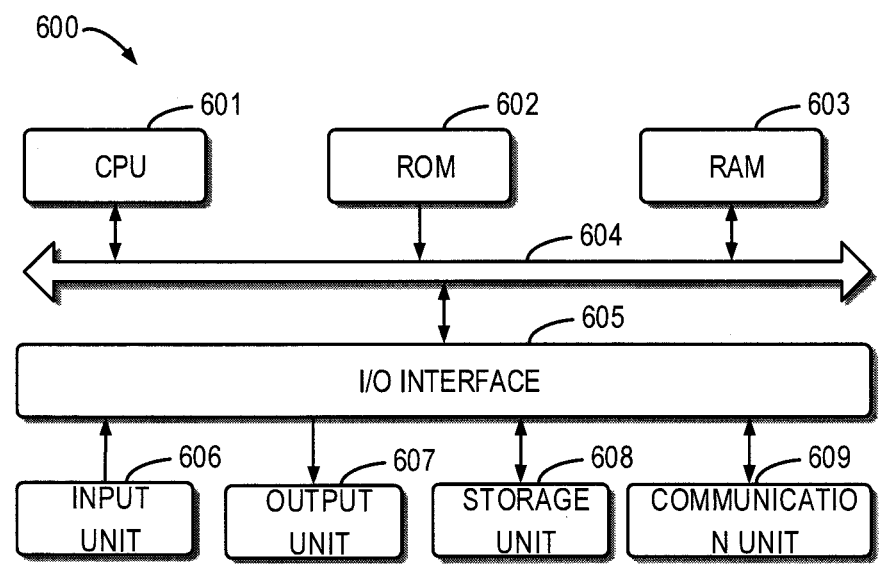
FIG. 6 illustrates a schematic block diagram of an example device that can be used to implement embodiments of the present disclosure.

FIG. 6 is a schematic block diagram illustrating an example device 600 that can be used to implement embodiments of the present disclosure. For example, the storage device 110 or the storage device 120 shown in FIG. 1 may be implemented by the device 600. As illustrated, the device 600 includes a central processing unit (CPU) 601 which can execute various appropriate actions and processing based on the computer program instructions stored in a read-only memory (ROM) 602 or the computer program instructions loaded into a random access memory (RAM) 603 from a storage unit 608. The RAM 603 also stores all kinds of programs and data required by operating the storage device 600. CPU 601, ROM 602 and RAM 603 are connected to each other via a bus 604 to which an input/output (I/O) interface 605 is also connected.

A plurality of components in the device 600 are connected to the I/O interface 605, including: an input unit 606, such as keyboard, mouse and the like; an output unit 607, such as various types of displays, loudspeakers and the like; a storage unit 608, such as magnetic disk, optical disk and the like; and a communication unit 609, such as network card, modem, wireless communication transceiver and the like. The communication unit 609 allows the device 600 to exchange information/data with other devices through computer networks such as Internet and/or various telecommunication networks.

Each procedure and processing as described above, such as the method 200 and/or 400, can be executed by the processing unit 601. For example, in some embodiments, the method 200 and/or 400 can be implemented as computer software programs, which are tangibly included in a machine-readable medium, such as the storage unit 608. In some embodiments, the computer program can be partially or completely loaded and/or installed to the device 600 via the ROM 602 and/or the communication unit 609. When the computer program is loaded to the RAM 603 and executed by the CPU 601, one or more steps of the above described method 200 and/or 400 are implemented.

The present disclosure may be a system, an apparatus, a device, a method, and/or a computer program product. The computer program product may include a computer readable storage medium having computer readable program instructions thereon for carrying out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local region network, a wide region network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local region network (LAN) or a wide region network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means (e.g., circuitry) for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As disclosed herein and in accordance with certain embodiments, techniques for data synchronization involve obtaining a first bitmap about (or provided for) a first storage device, the first storage device including a group of storage areas, a bit in the first bitmap indicating whether data in a corresponding storage area of a first size in the group of storage areas is to be synchronized to a second storage device. The technique further involves, in response to a configuration of the first storage device being changed, determining a second size of a storage area in the group of storage areas. The technique further involves converting the first bitmap into a second bitmap based on the first size and the second size. In addition, the technique further involves synchronizing data from the first storage device to the second storage device based on the second size and the second bitmap. Such techniques can ensure that the bitmap for data synchronization and the information about the size of the storage area are matched with each other, thereby avoiding data inconsistency between the first storage device and the second storage device.

In accordance with certain embodiments, the information about the size of the storage area includes metadata that defines and/or designates particular size criteria of the storage area. For example, the storage areas may be device extents and such metadata may identify an extent size for each device extent. In some arrangements, such metadata may be provided and/or accessible by a mirror module or a mirror driver residing in the storage system (e.g., within each storage device, other locations, etc.).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:
1. A method of data synchronization, comprising:
obtaining a first bitmap provided for a first storage device, the first storage device including a group of storage areas, a bit in the first bitmap indicating whether data in a corresponding storage area of a first size in the group of storage areas is to be synchronized to a second storage device;

in response to a configuration of the first storage device being changed, determining a second size of a storage area in the group of storage areas;

converting the first bitmap into a second bitmap based on the first size and the second size, a bit in the second bitmap indicating whether data in a corresponding storage area of the second size in the group of storage areas is to be synchronized to the second storage device; and synchronizing, based on the second size and the second bitmap, data from the first storage device to the second storage device;

wherein the first bitmap and first information about the first size are stored in a persistent storage device, and obtaining the first bitmap comprises:

obtaining the first bitmap from the persistent storage device.

2. The method according to claim 1, wherein the configuration of the first storage device indicates a size of the group of storage areas, the first bitmap and the second bitmap have a same number of bits, and determining the second size comprises:

in response to the size of the group of storage areas being changed, determining the second size based on the changed size of the group of storage areas and the number of bits.

3. The method according to claim 1, wherein synchronizing data from the first storage device to the second storage device comprises:

storing the second bitmap and second information about the second size in the persistent storage device; and in response to the second bitmap and the second information being stored in the persistent storage device, synchronizing data from the first storage device to the second storage device.

4. The method according to claim 3, wherein storing the second bitmap and the second information in the persistent storage device comprises:

merging the first bitmap and the second bitmap into a third bitmap;

replacing the first bitmap stored in the persistent storage device with the third bitmap;

replacing the first information stored in the persistent storage device with the second information; and replacing the third bitmap stored in the persistent storage device with the second bitmap.

5. The method according to claim 4, wherein the first bitmap indicates that data in a first storage area from the group of storage areas is to be synchronized to the second storage device, the second bitmap indicates that data in a second storage area from the group of storage areas is to be synchronized to the second storage device, and merging the first bitmap and the second bitmap into the third bitmap comprises:

merging the first bitmap and the second bitmap into the third bitmap, such that the third bitmap indicates that data in the first and second storage areas is to be synchronized to the second storage device.

6. The method according to claim 4, further comprising:

subsequent to the third bitmap being stored in the persistent storage device and prior to the first information being replaced by the second information, in response to the first storage device being recovered from a failure, obtaining the third bitmap and the first information from the persistent storage device;

determining the first size based on the first information; and synchronizing, based on the first size and the third bitmap, data from the first storage device to the second storage device.

7. The method according to claim 4, further comprising:

subsequent to the third bitmap and the second information being stored in the persistent storage device and prior to the third bitmap being replaced by the second bitmap, in response to the first storage device being recovered from a failure, obtaining the third bitmap and the second information from the persistent storage device;

determining the second size based on the second information; and synchronizing, based on the second size and the third bitmap, data from the first storage device to the second storage device.

8. The method according to claim 3, further comprising:

subsequent to the second bitmap and the second information being stored in the persistent storage device, in response to the first storage device being recovered from a failure, obtaining the second bitmap and the second information from the persistent storage device;

determining the second size based on the second information; and synchronizing, based on the second size and the second bitmap, data from the first storage device to the second storage device.

9. The method according to claim 1, wherein determining the second size of the storage area includes:

detecting that the first storage device has undergone a size change, and in response to detecting that the first storage device has undergone the size change, determining the second size, the second size being different from the first size.

10. The method according to claim 1, further comprising:

combining the first bitmap and the second bitmap to form a third bitmap and storing the third bitmap in persistent storage.

11. An apparatus for data synchronization, comprising:

at least one processing unit; and at least one memory coupled to the at least one processing unit and storing instructions for execution by the at least one processing unit, the instructions, when executed by the at least one processing unit, causing the apparatus to perform acts comprising:

obtaining a first bitmap provided for a first storage device, the first storage device including a group of storage areas, a bit in the first bitmap indicating whether data in a corresponding storage area of a first size in the group of storage areas is to be synchronized to a second storage device, in response to a configuration of the first storage device being changed, determining a second size of a storage area in the group of storage areas, converting the first bitmap into a second bitmap based on the first size and the second size, a bit in the second bitmap indicating whether data in a corresponding storage area of the second size in the group of storage areas is to be synchronized to the second storage device, and synchronizing, based on the second size and the second bitmap, data from the first storage device to the second storage device;

wherein the first bitmap and first information about the first size are stored in a persistent storage device, and obtaining the first bitmap comprises:

obtaining the first bitmap from the persistent storage device.

12. The apparatus according to claim 11, wherein the configuration of the first storage device indicates a size of the group of storage areas, the first bitmap and the second bitmap have a same number of bits, and determining the second size comprises:
in response to the size of the group of storage areas being changed, determining the second size based on the changed size of the group of storage areas and the number of bits.

13. The apparatus according to claim 11, wherein synchronizing data from the first storage device to the second storage device comprises:
storing the second bitmap and second information about the second size in the persistent storage device; and
in response to the second bitmap and the second information being stored in the persistent storage device, synchronizing data from the first storage device to the second storage device.

14. The apparatus according to claim 13, wherein storing the second bitmap and the second information in the persistent storage device comprises:
merging the first bitmap and the second bitmap into a third bitmap;
replacing the first bitmap stored in the persistent storage device with the third bitmap;
replacing the first information stored in the persistent storage device with the second information; and
replacing the third bitmap stored in the persistent storage device with the second bitmap.

15. The apparatus according to claim 14, wherein the first bitmap indicates that data in a first storage area from the group of storage areas is to be synchronized to the second storage device, the second bitmap indicates that data in a second storage area from the group of storage areas is to be synchronized to the second storage device, and merging the first bitmap and the second bitmap into the third bitmap comprises:
merging the first bitmap and the second bitmap into the third bitmap, such that the third bitmap indicates that data in the first and second storage areas is to be synchronized to the second storage device.

16. The apparatus according to claim 14, wherein the acts further comprise:
subsequent to the third bitmap being stored in the persistent storage device and prior to the first information being replaced by the second information, in response to the first storage device being recovered from a failure, obtaining the third bitmap and the first information from the persistent storage device;
determining the first size based on the first information; and
synchronizing, based on the first size and the third bitmap, data from the first storage device to the second storage device.

17. The apparatus according to claim 14, wherein the acts further comprise:
subsequent to the third bitmap and the second information being stored in the persistent storage device and prior to the third bitmap being replaced by the second bitmap, in response to the first storage device being recovered from a failure, obtaining the third bitmap and the second information from the persistent storage device;
determining the second size based on the second information; and
synchronizing, based on the second size and the third bitmap, data from the first storage device to the second storage device.

18. The apparatus according to claim 13, wherein the acts further comprise:
subsequent to the second bitmap and the second information being stored in the persistent storage device, in response to the first storage device being recovered from a failure, obtaining the second bitmap and the second information from the persistent storage device;
determining the second size based on the second information; and
synchronizing, based on the second size and the second bitmap, data from the first storage device to the second storage device.

19. A computer program product having a non-transitory computer readable medium which stores a set of instructions to perform data synchronization; the set of instructions, when carried out by computerized circuitry of a storage system, causing the computerized circuitry to perform a method of:
obtaining a first bitmap provided for a first storage device, the first storage device including a group of storage areas, a bit in the first bitmap indicating whether data in a corresponding storage area of a first size in the group of storage areas is to be synchronized to a second storage device;
in response to a configuration of the first storage device being changed, determining a second size of a storage area in the group of storage areas;
converting the first bitmap into a second bitmap based on the first size and the second size, a bit in the second bitmap indicating whether data in a corresponding storage area of the second size in the group of storage areas is to be synchronized to the second storage device; and
synchronizing, based on the second size and the second bitmap, data from the first storage device to the second storage device;
wherein the first bitmap and first information about the first size are stored in a persistent storage device, and obtaining the first bitmap comprises:
obtaining the first bitmap from the persistent storage device.

20. The computer program product of claim 19 wherein the storage system has an array of storage devices that includes
the first storage device and the second storage device;
wherein the storage system is constructed and arranged to perform host input/output (I/O) operations on the array on behalf of a set of hosts; and
wherein synchronizing the data from the first storage device to the second storage device includes:
while the host I/O operations are performed on the array that includes the first storage device and the second storage device, mirroring data between the first storage device and the second storage device.

* * * * *